US012592946B1

(12) United States Patent
Watkins et al.

(10) Patent No.: US 12,592,946 B1
(45) Date of Patent: Mar. 31, 2026

(54) DYNAMIC DETECTION OF ABNORMAL NETWORK ACTIVITY

(71) Applicant: Amazon Technologies, Inc., Reno, NV (US)

(72) Inventors: Catherine Watkins, Minneapolis, MN (US); Wayne Alan Fullen, Falls Church, VA (US); Jared Sylvester, Ellicott City, MD (US); Patrick Collard, Arlington, VA (US); Evripidis Paraskevas, Washington, DC (US); Jacob Nguyen, Annandale, VA (US); John Paul Schweitzer, Seattle, VA (US); Luke Kenneth Schubert, Virginia Beach, MD (US); Michael Lowney, Edgewater, VA (US); Parnavi Tamhankar, Arlington, VA (US); Stephen Goodman, Owings Mills, MD (US); William Kupersanin, Pasadena, MD (US); Ravi Karnam, Novi, MI (US); Sai Srinivas Vemula, Frederick, MD (US); Sameer Anil Murudkar, Sammamish, WA (US)

(73) Assignee: Amazon Technologies, Inc., Reno, NV (US)

( * ) Notice: Subject to any disclaimer, the term of this patent is extended or adjusted under 35 U.S.C. 154(b) by 359 days.

(21) Appl. No.: 18/083,293

(22) Filed: Dec. 16, 2022

(51) Int. Cl.
*H04L 9/40* (2022.01)
(52) U.S. Cl.
CPC ...... *H04L 63/1425* (2013.01); *H04L 63/1416* (2013.01)

(58) Field of Classification Search
CPC ........................ H04L 63/1425; H04L 63/1416
See application file for complete search history.

(56) References Cited

U.S. PATENT DOCUMENTS

| | | | |
|---|---|---|---|
| 6,321,338 B1 * | 11/2001 | Porras ................. | H04L 63/1416 709/224 |
| 6,449,739 B1 * | 9/2002 | Landan ............... | G06F 11/3414 714/E11.193 |
| 6,574,605 B1 * | 6/2003 | Sanders ............. | G06Q 10/1097 379/265.06 |
| 6,711,687 B1 * | 3/2004 | Sekiguchi ............. | G06F 21/554 713/186 |

(Continued)

*Primary Examiner* — Jason Chiang
(74) *Attorney, Agent, or Firm* — Hogan Lovells US LLP

(57) ABSTRACT

Approaches presented herein relate to the monitoring of network traffic, and identification of potentially malicious behavior, in a networked resource environment. Values for key features of interest can be extracted from monitored network traffic. This data can be aggregated for one or more data dimensions, such as for a given region, and modeling can be performed to generate distributions for those values in that region. A threshold can be applied to this distribution to identify anomalous activity, where the same threshold can be applied to distributions for different regions and the values that meet or exceed that threshold will differ across regions based at least in part upon different levels of activity or different behavior. Such an approach scales with changes in the amount or type of traffic to be monitored, and can handle very large numbers of resources and volumes of traffic. If potentially malicious behavior is identified, one or more remedial or mitigation actions may be taken.

20 Claims, 7 Drawing Sheets

(56)             References Cited

U.S. PATENT DOCUMENTS

| | | | | |
|---|---|---|---|---|
| 6,873,600 | B1 * | 3/2005 | Duffield | H04L 43/50 |
| | | | | 370/252 |
| 7,171,215 | B2 * | 1/2007 | Khouaja | H04W 36/30 |
| | | | | 455/452.2 |
| 7,215,637 | B1 * | 5/2007 | Ferguson | H04L 47/10 |
| | | | | 370/230.1 |
| 7,307,999 | B1 * | 12/2007 | Donaghey | H04L 63/1408 |
| | | | | 370/465 |
| 7,376,722 | B1 * | 5/2008 | Sim | H04H 60/31 |
| | | | | 709/224 |
| 7,464,410 | B1 * | 12/2008 | Halasz | H04L 63/1416 |
| | | | | 726/22 |
| 7,788,718 | B1 * | 8/2010 | Fei | H04L 63/1458 |
| | | | | 726/25 |
| 8,275,875 | B2 * | 9/2012 | Pruthi | H04L 41/142 |
| | | | | 709/224 |
| 2002/0194319 | A1 * | 12/2002 | Ritche | H04L 41/0677 |
| | | | | 709/224 |
| 2002/0197978 | A1 * | 12/2002 | Zavidniak | H04W 12/122 |
| | | | | 455/410 |
| 2003/0061017 | A1 * | 3/2003 | Dotaro | H04L 41/145 |
| | | | | 703/14 |
| 2003/0084349 | A1 * | 5/2003 | Friedrichs | G06F 21/55 |
| | | | | 726/22 |
| 2003/0101451 | A1 * | 5/2003 | Bentolila | G06Q 30/0251 |
| | | | | 725/35 |
| 2003/0115364 | A1 * | 6/2003 | Shu | H04L 63/0428 |
| | | | | 709/246 |
| 2003/0167402 | A1 * | 9/2003 | Stolfo | H04L 51/212 |
| | | | | 726/23 |
| 2003/0236995 | A1 * | 12/2003 | Fretwell, Jr. | H04L 67/14 |
| | | | | 726/25 |
| 2004/0054925 | A1 * | 3/2004 | Etheridge | H04L 63/1425 |
| | | | | 709/224 |
| 2004/0062199 | A1 * | 4/2004 | Lau | H04L 1/20 |
| | | | | 370/230 |
| 2006/0265745 | A1 * | 11/2006 | Shackleton | G06F 21/552 |
| | | | | 726/22 |

* cited by examiner

400

402 — *Monitor traffic / activity for a set of networked resources and write monitored data to an activity log*

404 — *Aggregate monitored data in the log, independent of number of resources or scale, for a recent period of time*

406 — *Select a key feature and one or more dimensions for the aggregated data to be modeled*

408 — *Perform modeling of the aggregated data for the selected key feature and dimension(s)*

410 — *Apply a threshold to a distribution produced by the modeling*

412 — *Determine whether data for any user(s), entity(ies), or account(s) meets or exceeds the threshold for the key feature*

414 — *Meet/ exceed?*

No

Yes

416 — *Take one or more remedial actions*

FIG. 4

DYNAMIC DETECTION OF ABNORMAL NETWORK ACTIVITY

BACKGROUND

In networked computing environments, mechanisms are often put in place to provide security against network-based attacks, such as network scanning attacks where a large number of network packets are sent out to devices across a network to attempt to gather information about those devices, which can be used for purposes such as to launch a sophisticated network attack. For shared resource or "cloud" environments that may contain a large number of devices that may be connected using a complex network configuration and/or split across various geographical or logical regions, detecting abusive scanning can be challenging due not only to the large volume of data but also the variability in behavior and activity levels across those regions. Existing approaches are unable to robustly identify malicious network activity in such networks, particularly as the level activity in those networks changes over time.

BRIEF DESCRIPTION OF THE DRAWINGS

Various embodiments in accordance with the present disclosure will be described with reference to the drawings, in which:

FIG. 4 illustrates an example process for dynamically determining abnormal activity that can be performed in accordance with various embodiments.

DETAILED DESCRIPTION

Figure 1:
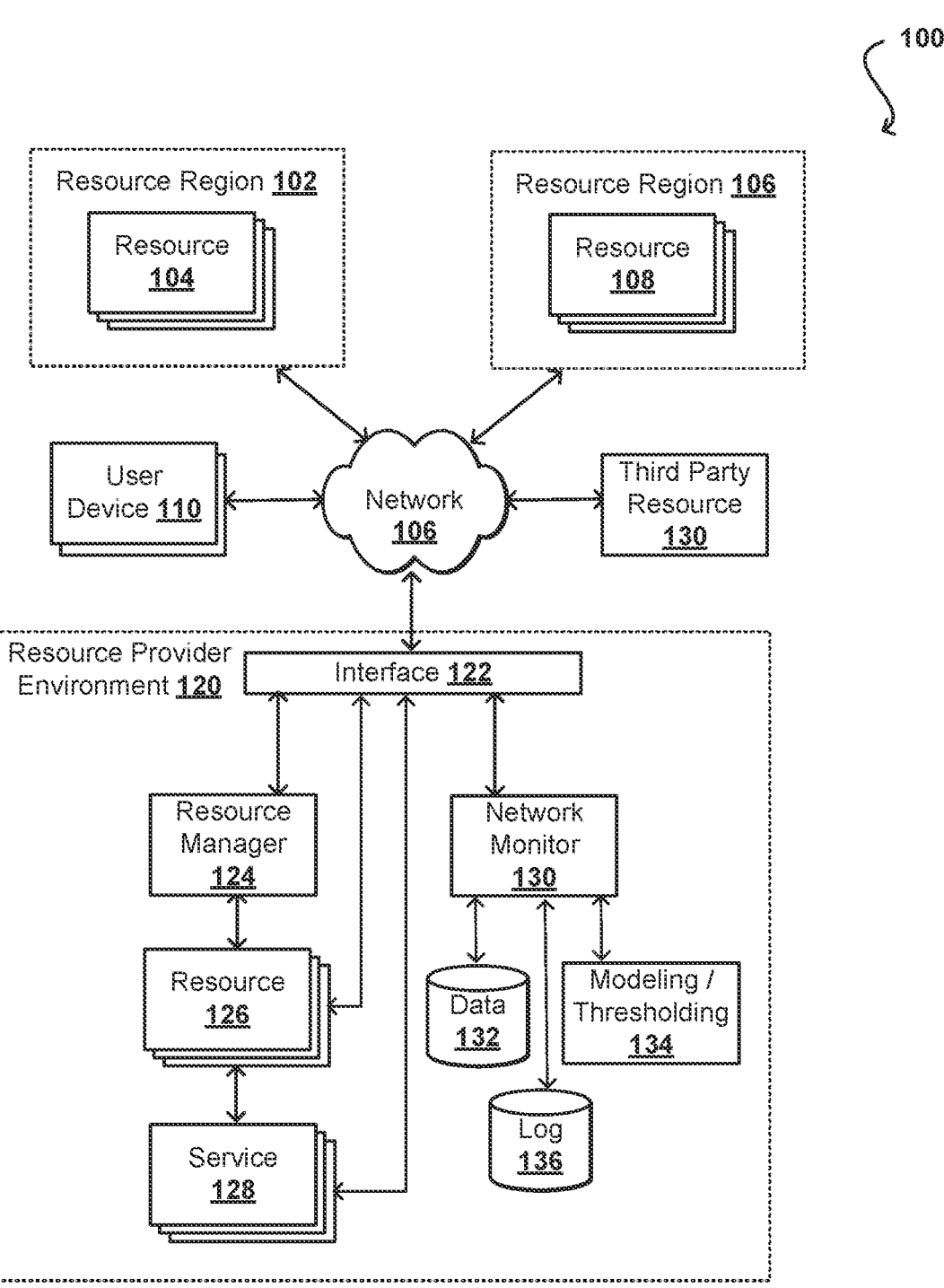
FIG. 1 illustrates an example system for monitoring communication behavior for resources and services in one or more regions that can be used in accordance with various embodiments.

Approaches described and suggested herein relate to the monitoring and analysis of traffic in a networked resource environment. In particular, various approaches can analyze data for network traffic associated with certain groups of resources or users to extract values for key features of that traffic that are determined to be of interest, such as those that may be indicative of certain undesirable behaviors (e.g., port scanning). Data values for these key features can be aggregated for one or more data dimensions, as may relate to a given resource region, service, or port, or combination of those dimensions, among other such options. Modeling can be performed for each such group or collection of data, such as to generate cumulative distributions functions or probability distributions for the key feature data associated with the selected dimension(s). Such a distribution may model, for example, the number of connection attempts made by individual users, or from individual network addresses, over a recent period of time, such as the last 24 hours. At least one threshold can be applied to this distribution in order to determine any activity that is anomalous or potentially malicious, such as by having a value that meets or exceeds a given threshold. By modeling the data at a determined frequency for different data dimensions, such an approach provides for dynamic thresholding or determinations of anomalous behavior based on recent activity or behavior for those various dimensions.

In this way, even if the same percentage threshold for a specific feature is applied to data distributions for different regions, the values associated with those thresholds can vary based upon the different activity or behavior in those different regions, such as where 100 connection attempts may be flagged as anomalous in a region with little activity while 100 connection attempts may be determined to be relatively insignificant in very busy region. Such an approach also can be used effectively as the groups of resources, users, ports, services, or other such aspects increases or decreases, even if those changes are significant (e.g., increases on the order of millions of network addresses), and can handle very large scaling, as the modeling and thresholding approaches will remain unchanged but will be applied to larger data sets. In some embodiments, sampling may be used for very large data sets to perform modeling without excessive resource requirements. The modeling can be updated at any determined frequency, such as hourly or daily, in order to provide accurate predictions or determinations of anomalous behavior. If anomalous and/or potentially malicious behavior is identified then one or more remedial or mitigation actions may be taken. This may include further performing analysis to determine whether the behavior is actually anomalous or represents a potential security risk, at which point an alert can be generated or an action can be taken such as to throttle or block certain traffic, or disable certain accounts or functionality. For at least certain determinations, this information can be logged or otherwise stored for subsequent analysis, such as for auditing or troubleshooting purposes. Such monitoring or detection methodologies can be tailored by dimensions such as service, protocol, and region, while also being regularly and automatically tuned for changes in network activity over time. Dynamic thresholding can help to identify key behavioral indicators of malicious behaviors within the entirety of a resource environment. For example, outputs of generated probabilistic models can be leveraged to make low latency detections of abusive scanning for a group of networked resources in near real time.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

FIG. 1 illustrates a networked environment 100 in which resources can be shared, or allocated for use, by one or more users in one or more locations. These resources can include any appropriate electronic resources for receiving, processing, transmitting, and/or storing data, as may include physical or virtual servers or machines, databases, and other computing, networking, or electronic devices. In this example, a resource provider may provide users with access to resources provided in a resource provider environment 120, which may include resources in one or more regions, such as a primary region of a resource provider environment as well as other regions 102, 106 that may be geographically and/or logically separated from a primary resource environment 120. Resources may be provided in different geographical regions for various reasons, including providing shortened distances between those resources and local users, which can help to reduce latency, as well as to spread out traffic to reduce the likelihood of bottlenecking. There may be other reasons for separating resources into various regions as well, as may relate to security, data privacy, and the like. In at least one embodiment, a user may use a user device 110, such as a desktop computer, notebook computer, tablet, smartphone, or wearable computer, to obtain access to an allocated portion of one or more of these resources across at least one wired or wireless network 106, such as the Internet, an ethernet, a local area network (LAN), a peer network, a cellular network, and the like. In some embodiments, a user may request to obtain an allocation of, or access to, one or more resources, and a resource manager 124 (or other such system or service) can first authenticate the user and determine any appropriate user permissions, and if permitted then that resource manager can provide that allocation or access using resources that are determined to be appropriate for the request, as may relate to a type, configuration, and capacity of one or more resources. A resource manager 124 can also determine one or more locations from which to provide these resources, such as resources 126 from a primary resource provider environment 120, or resources 104, 108 from one or more other resource regions 102, 106 that are logically part of that same resource provider environment (or managed resources on the premises of one or more users in some embodiments). In at least some embodiments, a user device 110 can also communicate with one or more services 128, such as Web services, that may be provided using resources in any or all of these regions 102, 106, 120. An interface layer 122 of the resource environment 120 can receive requests or transmissions to an appropriate interface, such as an application programming interface (API) and can direct the requests, transmissions, or other network traffic to the appropriate location.

As illustrated, there can be multiple user devices 110 that can communicate with multiple resources or services provided by a network provider. The resources or services can also communicate with each other within and across regions. There can also be communications with third party resources 130 or devices, where a third party resource may initiate a communication with a resource or service, for example, or may receive such a transmission across the at least one network 106. As mentioned, the ability for users, third parties, or other such entities or devices to attempt such communications can present a potential security risk for at least the resource provider. For example, an entity (which may include an automated program or "bot" operating on behalf of an entity) can launch a network scanning attack where a large number of network packets is sent out to resources in one or more of these regions to attempt to gather information about those resources, which can be used for purposes such as to launch a sophisticated network attack. This can include, for example, attempting to establish connections with various resources in one or more regions, where each connection attempt may be associated with a user account (or other such account) which may allow for at least some permission in attempting a connection to a specific resource, port, or type of resource, among other such options.

Accordingly, approaches in accordance with various embodiments can utilize a system, service, application, or process such as a network monitor 130 that is able to obtain information about network traffic in a resource provider environment 120, including traffic for other regions 102, 106 associated with that environment. This may include receiving telemetry data written to one or more flow logs 136 or other such locations or sources (or receiving/obtaining data that can be written to these logs as relevant telemetry data). Such a network monitor 130 can gather this data along various dimensions, such as for different regions, services, ports, address ranges, types of resources, types of users or user accounts, and so forth. This data can be gathered and analyzed at any appropriate time or interval, as may be configurable by a user or authorized entity, where the timing can also vary or differ between data dimensions. This may include, for example, collecting data for a given data dimension and predicting or analyzing that data for every day or hour, etc.

In the system illustrated in FIG. 1, a network monitor can work with at least one modeling and thresholding module 134 (or system, service, or process) that can take the data along these various dimensions and attempt to model or predict data values for these various dimensions. This may include, for example, modeling captured and/or stored data 132, such as the number of connections attempted to resources in the resource provider environment by a given user, user account, address, or device. This modeling may be performed across regions or specific to a particular region. This modeling may also be performed for resources associated with individual services or combinations of services, among other such options. This modeling can be used to predict, infer, or determine a model, plot, or function for a given data dimension that is indicative of behavior, performance, or usage according to that data dimension, such as the number of connection attempts in a given region that are associated with individual user accounts, where these connection attempts per account are aggregated and used to model how many connection attempts are to be performed in a given time period (e.g., day or hour) associated with specific user accounts, where the cumulative distribution will sum to the total number of connection attempts. Such a distribution can help to determine not only the minimum and maximum number of connection attempts by individual users or user accounts, but also values such as the mean value or standard deviation.

Once modeling has been performed, each model (e.g., a cumulative and/or probabilistic distribution) can be analyzed to attempt to determine an appropriate threshold over which (or under which in some situations) the number, frequency, or other such value is determined to be abnormal, suspicious, or otherwise worth investigating or analyzing. This threshold can be determined automatically or manually, and may be configurable or adjustable by a user, provider, application, service, or other such source in at least some embodiments. For example, it may be determined after analyzing a model (or a set or sequence of models of similar dimensions) that an appropriate abnormal value threshold should be set at a value around 98% to 99%, such as where 98% to 99% of users have similar, consistent, or expected values, and only around 1% to 2% of the users have values that appear abnormally high or large. For values such as a number of connection attempts per user account, this abnormally high value may correspond to a high probability of an attack or other unintended or undesired activity. While values above that threshold may correspond to legitimate behavior, the values are considered worth investigating or, in some cases, generating an alert or automatically taking remedial action, such as to block or throttle traffic for a given account or source. A threshold may be determined at a fixed percentage in some embodiments, but modeling for individual dimensions at different times (e.g., hours or days) can enable the values that satisfy or exceed that threshold to change dynamically as the traffic or behavior of the system along those different dimensions (e.g., service, region, or time) changes or differs, such that a much higher value may be needed to satisfy the same percentage threshold in one region than in another due at least in part to the traffic observed in that region. Such an approach can scale to a very large number of resources or amount of traffic, such as may correspond to all sources in an entire region, automatically and without manual input in at least some embodiments. A modeling and/or thresholding module 134, system, or service can provide information based at least in part upon the modeling and thresholding, which can be used by a network monitor 130 to generate alerts, log results, or take remedial actions, among other such possibilities. Similarly, data from the modeling or thresholding module 134 can be used to generate an interface or presentation of the models for various dimensions, as well as information about the thresholds and users, entities, accounts, or other sources that have been determined to exceed a threshold for at least one dimension, or set of dimensions, and enable information to be viewed or obtained for those situations.

Figure 2A:
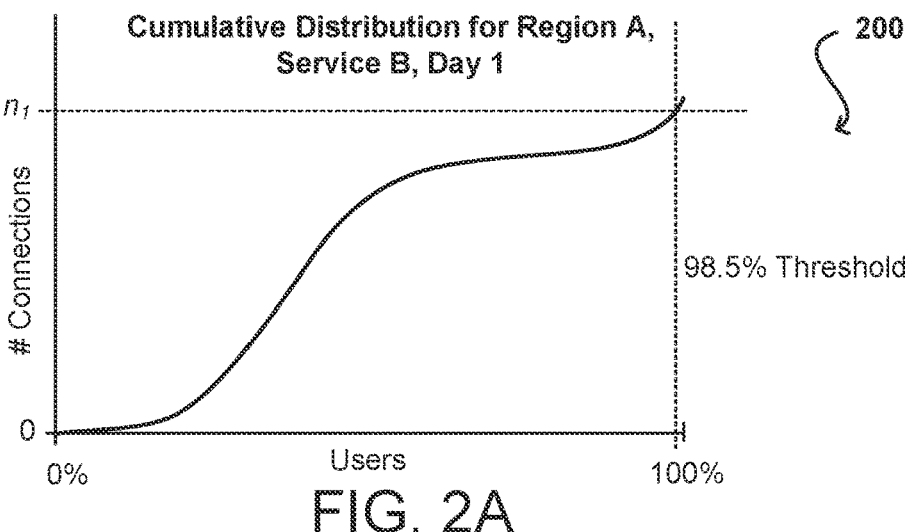
FIGS. 2A, 2B, and 2C illustrate example distributions for different regions, services, and/or time periods that can be generated in accordance with various embodiments.
Figure 2B:
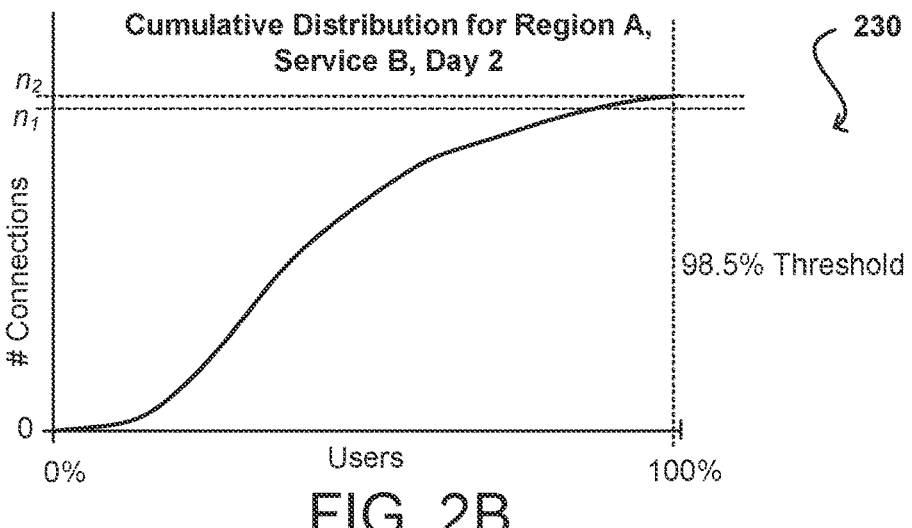
Figure 2C:
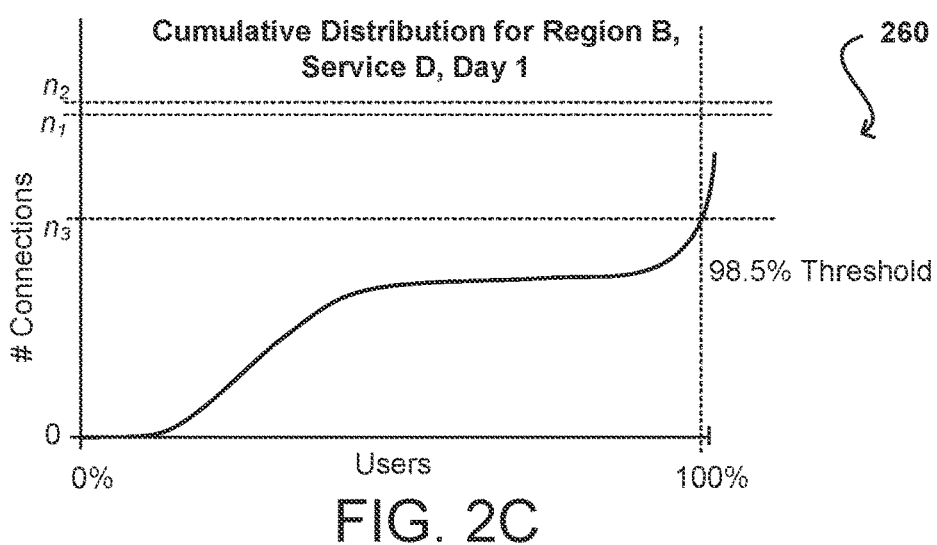

FIGS. 2A, 2B, and 2C illustrate example distributions that can be generated by an example modeling component or process in accordance with at least one embodiment. Although cumulative distributions are illustrated for an example set of dimensions, it should be understood that many other types of distributions, functions, or models can be generated and used as well for various other dimensions, or groups of dimensions, in accordance with various embodiments. In this example, there are three different plots that represent cumulative distributions for the number of connections (or connection attempts) made by individual users (or associated with individual user accounts). Users in this context may be determined by requests or traffic associated with a single device or address, such as an IP address. In FIG. 2A, this plot 200 represents a modeling of the number of connections in a specific region (region A) that relate to a specific service (service B) on a given day (day 1). It can be seen that a threshold of 98.5% is applied, which in this case results in a value of m. Thus, any user that has a number of connections, or connection attempts, at or above m can be determined to display abnormal behavior, or at least behavior for which investigation or action may be warranted. In FIG. 2B, a second plot 230 is illustrated for the same region and service, but on a subsequent day. It can be seen that the model plot 230 (here, the cumulative distribution) is significantly different that the plot 200 for the prior day, as may be based upon different amounts of network traffic or different behavior, as may correspond to a difference such as day of the week, holiday occurrence, or change in service, etc. While the same threshold is applied, the value $n_2$ corresponding to that threshold is different than the value mi for the previous day, which is dynamically determined to change based at least in part upon the change in behavior determined or modeled for those different days. Such an approach thus enables a single threshold to be applied across a set of dimensions, but accounts for changes in what is considered to be "normal" or expected behavior based upon determined changes for that period of time. Similarly, in FIG. 2C a third plot 260 is illustrated for the same day (day 1) as for the first plot 200, but for a different region and service. It can be seen that the cumulative distribution of this plot 260 is significantly different, even though still looking at the number of connections (or connection attempts) per user (or user account). The same connection threshold may be applied, but the value $n_3$ corresponding to that threshold is shown to be much lower than the values $n_1$, $n_2$ for the other plots 200, 230, as there may be significantly different behavior for different regions and/or services. As mentioned, different thresholds might be applied to any or all of these situations in various embodiments. Such an approach enables thresholds to be applied across any given selection or combination of dimensions, where the values corresponding to those thresholds will be determined dynamically based upon modeling of current and/or recent data for a given time period. Such an approach also supports scaling to much smaller or larger sizes without changes in the algorithms or processes, as the changes in behavior will be captured by the modeling and the same threshold can still be applied.

Figure 3:
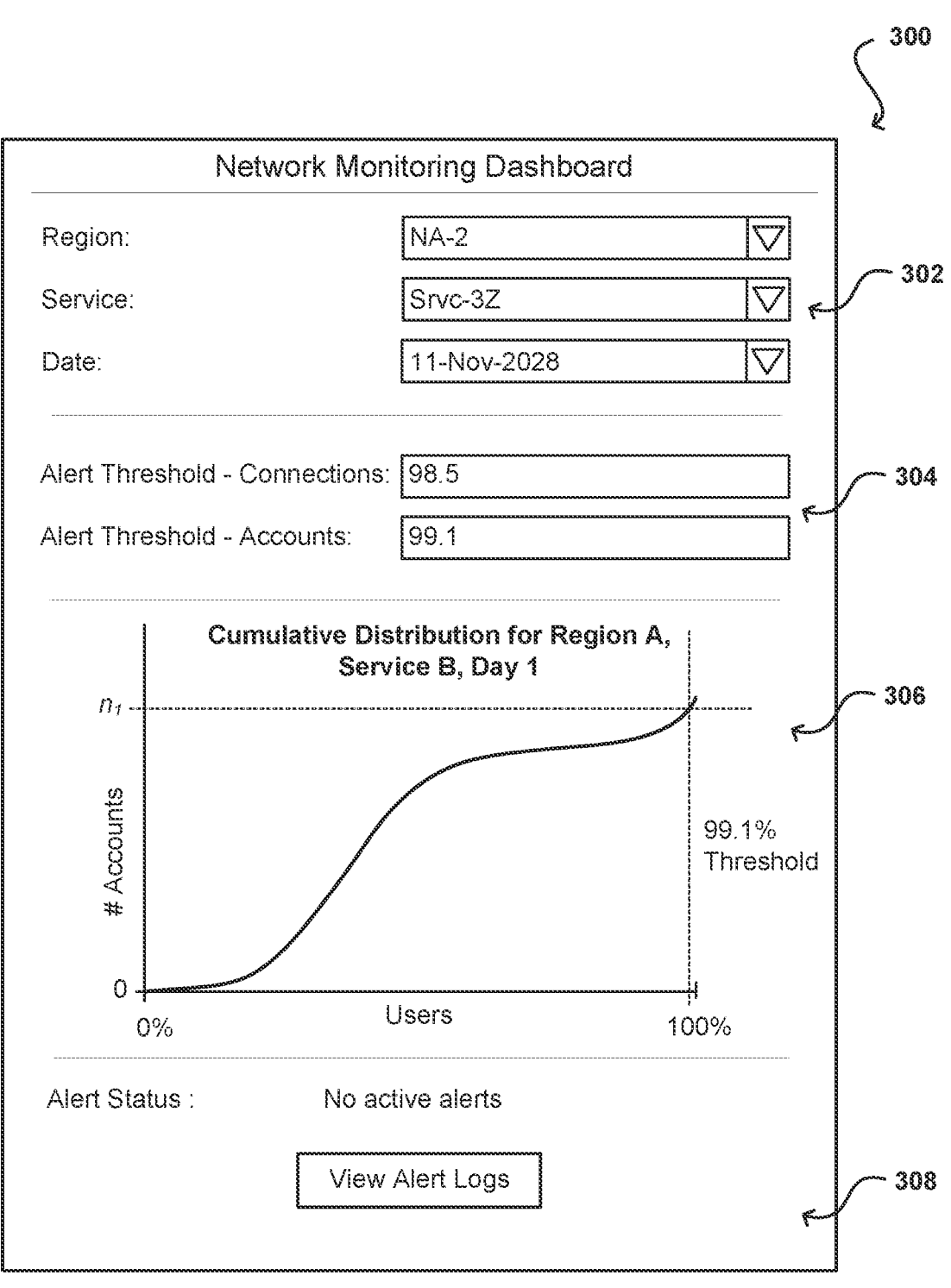
FIG. 3 illustrates an example interface for setting thresholds for abnormal activity and viewing activity data that can be generated in accordance with various embodiments.

FIG. 3 illustrates an example interface 300 that can be provided for presentation in accordance with at least one embodiment. This example interface 300 provides options 302 that enable a user, provider, or other authorized entity to obtain information for various combinations of dimensions, which in this case include a specific region, service, and date, although various other dimensions can be provided as well as discussed and suggested elsewhere herein. In this example, a user can specify values for each of these dimensions, and a corresponding plot 306 of the relevant model for those dimensions can be presented. In this example, the plot 306 is a cumulative distribution, although other types of plots or representations of data can be utilized as well. In this example, the current applicable threshold is displayed, along with the respective value that satisfies that threshold. A user can then determine if this threshold still makes sense for these dimensions based at least in part upon the current plot. The interface 300 provides the user with options 304 for adjusting one or more thresholds for these dimensions. Any adjustment to these threshold values can be updated on the plot 306, such that the user can see the impact on the plot as well as the value. Other information 308 can be provided through such an interface as well, as may relate to a current alert status, such as if there are any users or user accounts that currently meet or exceed at least one relevant threshold for these dimensions. There may also be an option to view alert logs, users logs, flow logs, or other such information. An interface may also allow a user to perform other tasks as well, such as to add or remove dimensions, modify behaviors or types of alerts, and so on.

Such an approach can enable activity such as scanning of a network, or group of networked resources, to be detected for a large number of resources that may be distributed across two or more regions. Abusive scanning, or other malicious network activity, can be detected using such detection methodology, which can be tailored by aspects or dimensions such as service, protocol, and/or region, while also being regularly tuned or updated to account for changes in network activity over time. In at least one embodiment, such detection methodology can monitor data for these aspects or dimensions, and can generate distributions or models of key behavioral indicators of malicious activity, such as network scanning. This can include creating probabilistic models that identify malicious behaviors within the entirety of a network landscape. Outputs of these probabilistic models can be leveraged to make low latency detections of abusive scanning in near real time.

For a network or group of resources that can be accessed over the internet, this can include detecting enumeration of those resources as may include detecting port scanning across a region of Internet protocol (IP) address space. For resources provided by a single provider that may be distributed across multiple regions, zones, or other such locations or groupings, the scanning may be performed within a given region and corresponding IP space, or across multiple (or all) regions. This can be performed even in situations where different regions may include different systems or services that may include different roles, permissions, or configurations, where activity that may be considered to be potentially malicious in one region might be considered benign in another region.

In at least one embodiment, a network monitoring system or service may perform modeling for specific aspects of that network over time in order to attempt to identify one or more specific types of potentially malicious (or otherwise undesired, unauthorized, or unintended) behavior. This may include, for example, activity with respect to network ports of specific types of resources. Information about activity on those ports, whether specific to a region or across regions, can be collected and used to inform a probabilistic model of activity. Each probabilistic model (or probability distribution function, etc.) can be updated over time, to represent current and/or recent activity, and there may be one model maintained for each region in at least one embodiment, such that the model is representative of behavior within that region. Real-time modeling can provide more accurate behavior and risk determinations that prior, static approaches, as activity that is potentially malicious may vary over time as activity within a region changes.

In at least one embodiment, for any given monitored aspect of a group of networked resources, a threshold can be determined that is representative of suspicious behavior, or at least abnormal, anomalous, unexpected, or undesired behavior. For example, if an entity is trying to connect to a number of machines that is higher than 98% of the other entities based on the determined current distribution in the current region, then that entity may be flagged as exhibiting suspicious behavior. The threshold itself may be static, dynamic, or user configurable, for example, but the number of connection attempts that meets that threshold will vary over time as the probability distribution changes. In this way, larger numbers of connection attempts may be treated as less suspicious during busy times, or in busy regions, where there are larger numbers of connection attempts on average, or in total. Such an approach can provide more accurate results that prior threshold values that were fixed, such that a number of connections might have been viewed as suspicious even if at the current time, and in the current region, such a number of connections might have been completely reasonable.

Expected versus abnormal behavior may also vary based at least in part upon other factors as well, such as a type of application, service, or operation that is involved in the connection attempts. Normal behavior can also vary based on the specific port(s) being monitored, as certain ports will often be significantly busier than others during normal operation. The same port for the same service may also experience significantly different behavior in different regions. For example, a region allocated to the United States may have many more machines and host significantly more traffic than a region allocated to Monaco, such that the numbers of connections or accounts would be expected to be much larger even under typical or expected operation. Accordingly, it can be beneficial to determine one or more behavioral distributions for each region (or other resource grouping) and/or service, for example, and applying the thresholds to those region- and/or service-specific distributions.

As mentioned, a resource provider environment such as that discussed with respect to FIG. 1 can provide rich behavioral data from a very expansive infrastructure and activity monitoring system, which can include data for various aspects at various different levels. This can allow a monitoring entity to determine how best to partition the data for analysis. For example, one entity might want to look at behavior separately in each region, while another entity might want to look at behavior separately for each service even though the behavior for a given service may span multiple regions. Users may also obtain more granular data partitioning, as may relate to individual roles for individual services in individual regions, among other such options. Users may be able to specify and/or modify the partitioning used, as specify which partitions are of concern or for which specific actions should be taken. There may also be different thresholds applied for each of these partitions. In at least one embodiment, a system can model aspects such as the number of resource instances and number of accounts with which a particular IP address is attempting to interact, for example, where that modeling may be done on a per-region and per-service basis, among other such options. It should be understood, however, that various other types of data relevant for dynamic detection can be captured and modeled as well within the scope of the various embodiments. These aspects may relate to other security threats or abnormal behaviors as well, as may relate to profile scanning or other such attacks.

In at least one embodiment, telemetry data for a given region can be collected. Telemetry data can include any data created by a system or service, for example, that is remotely collected through the use of components such as agents and protocols, which can include data relating to metrics, events, logs, and traces, among other such options. Received or collected telemetry data, or features extracted from that data, can be aggregated for the region on a specific port, or over a range of ports, and these aggregated features can be used to generate a distribution function across the entire port(s) on a population of all IP addresses, or a range of IP addresses. As mentioned, the data for a given region may still be very large, so while such an analysis may provide some insight at a high level, it may be beneficial to analyze the data at a more granular level, such as at the service level. The distribution generation and tuning can then be performed on a per-service basis within a given region in this example. And for a given service in a given region, a threshold may be set at a value such as 0.99995, whereby if an entity is attempting to interact with ports at a rate or number that is greater than 99.995% of the population over a recent period of time, such as over the last day or hour, a determination can be made that this behavior is abnormal or suspicious, and an alert or notification can be generated, or remedial or preventative action taken, such as to block further communication from that source, entity, or address. As mentioned, these boundaries or thresholds can be set on a per-feature (or per-aspect) basis.

In at least one embodiment, individual distributions can be computed for discrete points but continuously in time. The output can then be a feature value based at least on the probability that is set. For example, new values may be produced on a daily basis for the number of accounts and number of instances that are required for an entity to attempt to interact on, for example, a minute-by-minute basis before that behavior is flagged as suspicious or abnormal. While the threshold values may not change between days, the feature values that will correspond to those thresholds will likely change due at least in part to a change in the distribution to which that threshold is applied. In some embodiments, new thresholds may be calculated daily (or at other appropriate times) based at least in part upon the determined models, such that the thresholds are most appropriate for current or recent conditions, such as where behavior becomes more or less consistent or uniform across users. For different types of distributions, the thresholds may also be set as some measure of the mean, standard deviation, or other such value.

In at least some embodiments, data for these various models can be stored for subsequent offline analysis. Such analysis can attempt to determine thresholds that are appropriate for current behaviors for specific dimensions, combinations of dimensions, or types of data being analyzed, and in some embodiments may also attempt to account for trends or predicted changes in order to proactively adjust thresholds to attempt to obtain more accurate determinations or abnormal behavior. In some embodiments, thresholds may also be updated in real time, or at least online, such as where the modeled behavior is significantly different than expected, or different from prior behavior, such that the current threshold is likely sub-optimal. In some embodiments, thresholds may not adjust dynamically for all data dimensions, or combinations of dimensions, but may instead only dynamically be adjusted for dimensions that correspond to key features indicated by a user or provider to be relevant for a particular type of behavior, such as port scanning. Once set, these models and thresholds can be applied to behavioral or other such data in a real-time or semi-streaming fashion in at least some embodiments and implementations.

In at least some embodiments, the frequency with which modeling occurs can depend at least in part upon the anticipated stability (or variability) in the underlying data distribution. In at least some embodiments, stability can be such that modeling on a daily basis may be sufficient, and allows for collection of a sufficient amount of data for adequate modeling. In some embodiments, there may be different modeling frequencies for different data dimensions, such as for different regions or services. In some embodiments, where behavior may change drastically during different parts of the day, such as during business hours versus overnight, there may be different modeling performed for each period as activity determined to be abnormal may vary substantially by time of day. In at least one embodiment, the distributions can be performed in batch fashion at appropriate times. The analysis may focus not only on dimensions of data, such as number of accounts, instances, or connections/ attempts, but also combinations or ratios of these dimensions. In some embodiments the data may be collected at relatively small intervals, such as each minute, then aggregated at another interval, such as hourly, then fed to the 24 hour distribution computation for analysis and modeling.

In at least one embodiment, a binary classification can be performed for each user, user account, or other such metric or entity based upon whether or not the corresponding value being modeled meets or exceeds the relevant threshold for the dimension(s) being analyzed. In other embodiments, a probability may be calculated based at least in part upon a value relative to a threshold. In other embodiments, fixed or variable thresholds may not be used at all, with machine learning or algorithms used to determine a probability or confidence that specific behavior is undesired or abnormal, etc. Further, various types of distributions can be used as discussed elsewhere herein, as may include cumulative distribution functions (CDFs), probabilistic functions, parametric or non-parametric functions, and so on.

FIG. 4 illustrates an example process 400 for identifying potentially abnormal behavior in a networked resource environment that can be performed in accordance with various embodiments. It should be understood that for this and other processes presented herein there may be additional, fewer, or alternative steps performed in similar or alternative orders, or at least partially in parallel, within the scope of the various embodiments unless otherwise specifically stated. Further, although this example is discussed with respect to users and thresholds, it should be understood that resources can be monitored based on other criteria or associations, and that approaches other than thresholding can be used to determine whether to take a remedial (or other such) action in accordance with other embodiments. In this example, network traffic is monitored 402 and information about that network traffic can be written to one or more network logs, or other such data repositories. The data can be aggregated 404 for sources of the network traffic over a period of time, regardless of a size or scale of the set of resources being monitored. One or more dimensions of data to be analyzed for a selected feature (of a set of possible features of the network traffic) can be selected 406, where those dimensions can include aspects or dimensions such as regions, services, types of resources, or port addresses, and where selected feature(s) can include key features useful in predicting certain types of behavior, such as number of accounts for which connection attempts were made or the overall number of connection attempts made from a given address that may be useful in identifying potential port scanning, among other such options. The corresponding data from the network log(s) can be used to perform 408 modeling of the feature data for those dimensions, such as to generate a cumulative distribution function for the number of connections attempted by a given user for a specific region and service over a specified period of time. Once a model (e.g., a cumulative function) is obtained for this feature data for the relative dimensions, a corresponding threshold can be applied 410, where that threshold can indicate a percentage of that distribution at, or above which, values for that key feature that are determined to represent abnormal, or at least suspicious or anomalous behavior, based on current behavior of the network resources across the selected dimensions. The distribution can be analyzed to determine 412 whether any values for the key feature meet or exceed the applied threshold. If it is determined 414 that none of the values meet or exceed the threshold value, then it can be determined that all monitored activity across these dimensions falls within an expected or normal range for current or recent behavior or activity, and the process can continue for the next time period. If, however, it is determined that at least one user meets or exceeds the threshold value for these dimensions, then at least one remedial action can be taken 416. In at least one embodiment, a remedial action may involve generating an alert, sending a notification, throttling traffic permitted for that user, blocking a source address, logging abnormal activity, or taking another such action. In at least one embodiment, the remedial action taken may be user or provider configurable, and may depend at least in part upon the type of activity or an extent to which the behavior exceeds the threshold, among other such options.

Such an approach can enable determining whether activity from a specific IP address, for example, is abnormal or anomalous relative to any given number of other IP addresses with similar dimensions, such as in a given region or with respect to a specific service. Regardless of the number of such addresses, activity or behavior data can be captured for these addresses in near real time, then aggregated to generate a model of activity across all those IP addresses over a recent period of time. Applying a percentage (or other such) threshold to this data once modeled can quickly identify outliers, where values that qualify as outliers will change as the activity or behavior corresponding to IP addresses for those dimensions changes. This may include, for example, determining the number of accounts to which each IP address attempted to connect over that period of time, and then determining how many such attempts is anomalous for the monitored activity over that period of time.

In some embodiments, there may be multiple features analyzed with a probabilistic threshold applied to each feature. In such cases, activity may be determined to be anomalous if either threshold is met or exceeded, or may require that all thresholds are met or exceeded, or some combination of thresholds. In some embodiments more complex logic may be used, such as where a value that exceeds one threshold may be considered to be anomalous if another threshold is exceeded by a certain amount, but not otherwise. There may be probabilities or statistics applied to attempt to make decisions based on the combinations of values relative to those thresholds, among other such options. In some embodiments, a thresholding approach can be used to identify potentially anomalous behavior, and then additional analysis can be performed using additional algorithms, processes, calculations, or metrics to attempt to determine whether the determination was accurate, or whether it was a false positive or false negative. Mitigations, remediations, or other such actions can be taken in response to accurate determinations where appropriate. Determinations of false positives or false negatives may be used to adjust the thresholds as appropriate.

In at least one embodiment, a look up table can be created after a cumulative distribution function (CDF) is generated for one or more dimensions. There may be one look up table for each such CDF. The look up table can store data values for the various key features. The look up table can be used to determine, for example, that a given IP address touched 10 accounts on a per region, per port, and/or per service basis. The look up table can also be used to determine how often it was observed that an IP address touched 10 accounts within a relevant period of time, and potentially determine a probability of an IP address touching 10 accounts. A probability threshold can then be determined base at least in part upon the number of accounts that have, or are predicted to, exceed that probability threshold. This data can also be used to inform relative analytics used for behavioral and other such determinations. The data in this table can be updated at any relevant frequency, such as every hour, six hours, or day, among other such options. Various other potentially relevant information can be stored in such a lookup table as well.

Output other than lookup tables can be generated as well. For example, there may be summary statistics generated for various features across various dimensions, or combinations of dimensions. These statistics may include data such as minimum value, maximum value, average deviation, percentile results, and so forth. These statistics can be used to determine when or how to best consult the lookup table in at least some embodiments. The values can also be used to quickly determine variations in the distribution function between different time periods or for different dimensions. In some embodiments, a lookup table may only store the most recent data, such as data for the last 24 hours or previous day, while in other embodiments the lookup table may store data for multiple such periods, or prior lookup tables can be archived for subsequent analysis, among other such options. Such an approach can also allow for the production of running averages and other such values that can be used to identify trends or predict future variations.

Different embodiments may take various different approaches, such as to use a parametric approach versus a non-parametric approach, including different data structures. These can be used for various distributions, including CDFs, empirical distributions, fitting distributions, and the like. In at least one embodiment, a Fréchet distribution can be used to provide a maximum or extreme value distribution. Other types of distributions or data structures can be used as well in other embodiments. Further, instead of looking at all data for a time period, such as a day, some amount of random or non-random sampling could be performed to attempt to extrapolate behavior by modeling based on only that representative sampling. In some embodiments, functions for different features can be used to more accurately model results for smaller subsets of data or as different features interact with each other, among other such options. Modeling on a sampling of data may be appropriate for very large data sets or groups of resources, as accurate modeling can be obtained (within acceptable amounts of variation) but the amount of memory, processing, bandwidth, and other such capacity can be drastically reduced. Sampling may be further important when additional features or dimensions are analyzed, such as to capture host identities, or types of network sites or resources for which connection attempts were made, and so forth. Such analysis and functionality can also be utilized at other levels, such as at an application or service level, rather than a network level. For example, errors such as access denial errors can be modeled, and thresholds applied, to determine when users are having abnormally high rates of specific types of error, which may be used to help troubleshoot an application or service, or identify unintended use of such an application or service.

Figure 5:
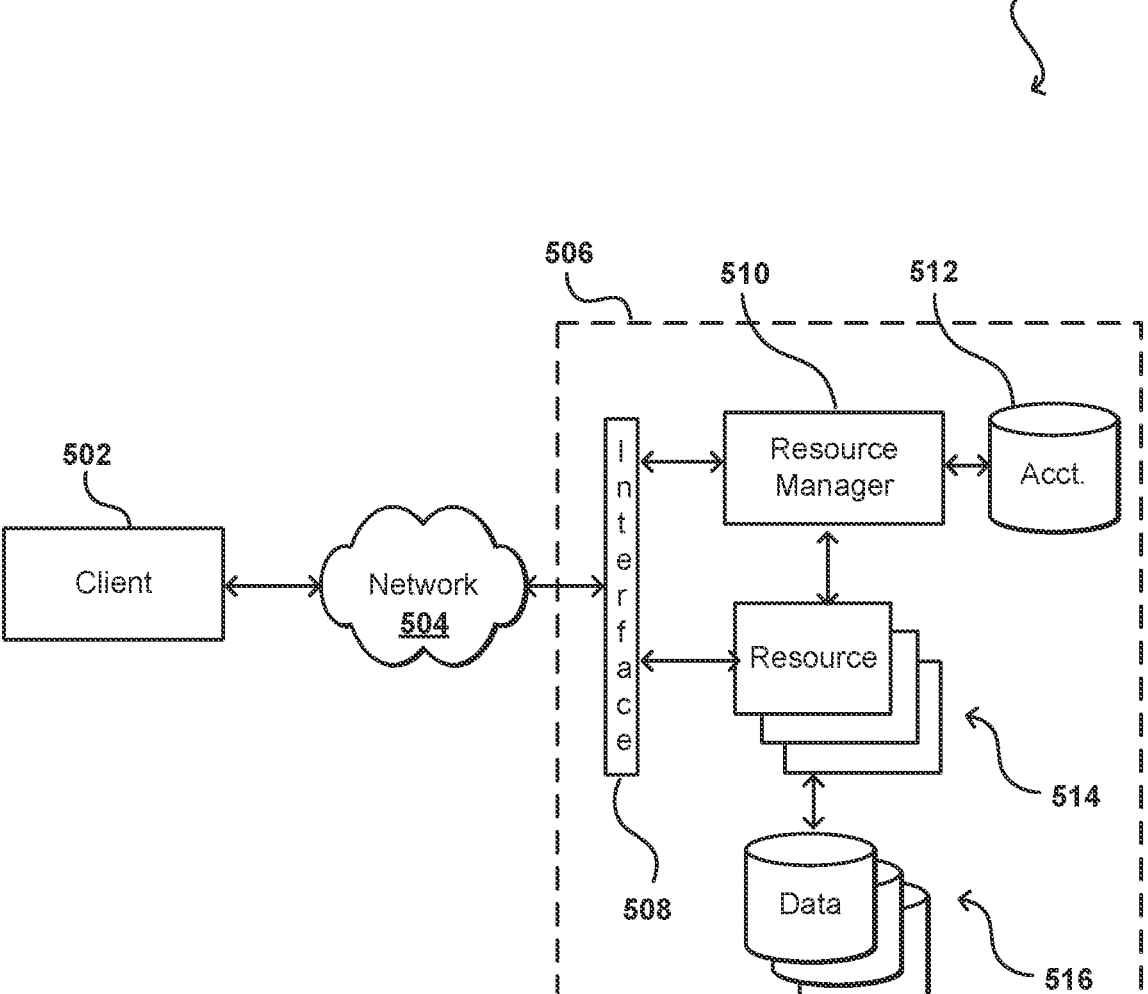
FIG. 5 illustrates an example network-inclusive computing environment in which aspects of various embodiments can be implemented.

FIG. 5 illustrates an example environment 500 in which aspect of various embodiments can be implemented. Such an environment can be used in some embodiments to provide resource capacity for one or more users, or customers of a resource provider, as part of a shared or multi-tenant resource environment. In this example a user is able to utilize a client device 502 to submit requests across at least one network 504 to a multi-tenant resource provider environment 506. This can include an end client that is able to use a certificate for secure communications, where the certificate was obtained using a requestor executing on the end client. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 504 can include any appropriate network, including an intranet, the Internet, a cellular network, a local area network (LAN), or any other such network or combination, and communication over the network can be enabled via wired and/or wireless connections. The resource provider environment 506 can include any appropriate components for receiving requests and returning information or performing actions in response to those requests. As an example, the provider environment might include Web servers and/or application servers for receiving and processing requests, then returning data, Web pages, video, audio, or other such content or information in response to the request. The environment can be secured such that only authorized users have permission to access those resources.

In various embodiments, a provider environment 506 may include various types of resources that can be utilized by multiple users for a variety of different purposes. As used herein, computing and other electronic resources utilized in a network environment can be referred to as "network resources." These can include, for example, servers, databases, load balancers, routers, and the like, which can perform tasks such as to receive, transmit, and/or process data and/or executable instructions. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of resources 514 of one or more types. These types can include, for example, application servers operable to process instructions provided by a user or database servers operable to process data stored in one or more data stores 516 in response to a user request. As known for such purposes, a user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 514 can submit a request that is received to an interface layer 508 of the provider environment 506. The interface layer can include application programming interfaces (APIs) or other exposed interfaces enabling a user to submit requests to the provider environment. The interface layer 508 in this example can also include other components as well, such as at least one Web server, routing components, load balancers, and the like. When a request to provision a resource is received to the interface layer 508, information for the request can be directed to a resource manager 510 or other such system, service, or component configured to manage user accounts and information, resource provisioning and usage, and other such aspects. A resource manager 510 receiving the request can perform tasks such as to authenticate an identity of the user submitting the request, as well as to determine whether that user has an existing account with the resource provider, where the account data may be stored in at least one data store 512 in the provider environment. A user can provide any of various types of credentials in order to authenticate an identity of the user to the provider. These credentials can include, for example, a username and password pair, biometric data, a digital signature, or other such information. The provider can validate this information against information stored for the user. If a user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identity, specific address, or other such information that can enable the client device 502 to communicate with an allocated resource without having to communicate with the resource manager 510, at least until such time as a relevant aspect of the user account changes, the user is no longer granted access to the resource, or another such aspect changes. In some embodiments, a user can run a host operating system on a physical resource, such as a server, which can provide that user with direct access to hardware and software on that server, providing near full access and control over that resource for at least a determined period of time. Access such as this is sometimes referred to as "bare metal" access as a user provisioned on that resource has access to the physical hardware.

A resource manager 510 (or another such system or service) in this example can also function as a virtual layer of hardware and software components that handles control functions in addition to management actions, as may include provisioning, scaling, replication, etc. The resource manager can utilize dedicated APIs in the interface layer 508, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 508 in at least one embodiment includes a scalable set of user-facing servers that can provide the various APIs and return the appropriate responses based on the API specifications. The interface layer also can include at least one API service layer that in one embodiment consists of stateless, replicated servers which process the externally-facing user APIs. The interface layer can be responsible for Web service front end features such as authenticating users based on credentials, authorizing the user, throttling user requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, users of the control service. The servers of the Web services layer can be stateless and scaled horizontally as known in the art. API servers, as well as the persistent data store, can be spread across multiple data centers in a region, for example, such that the servers are resilient to single data center failures.

Figure 6:
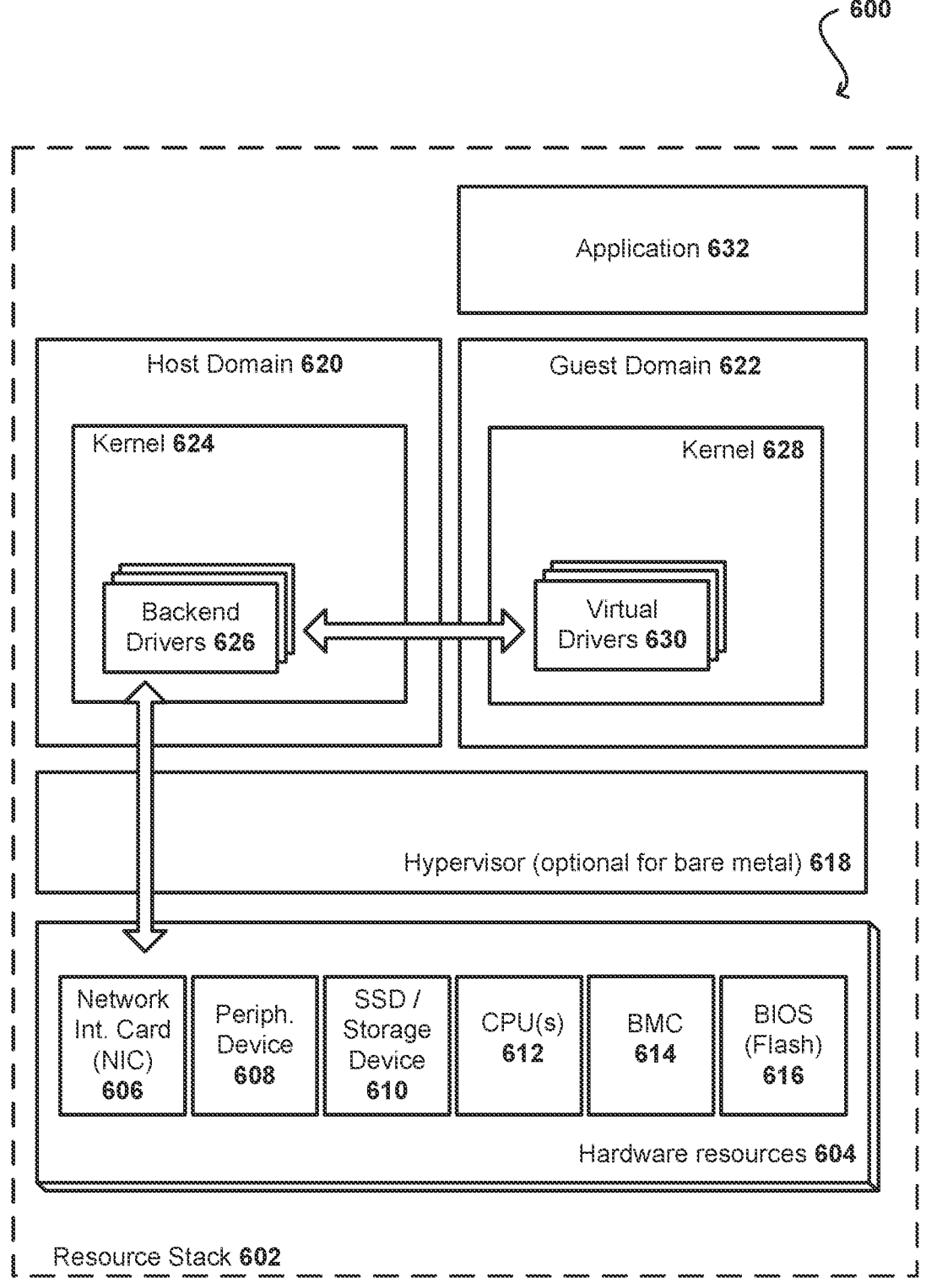
FIG. 6 illustrates example components of a server that can be utilized to perform at least a portion of a transcoding process, in accordance with various embodiments.

FIG. 6 illustrates an example resource stack 602 of a physical resource 600 that can be utilized in accordance with various embodiments. Such a resource stack 602 can be used to provide an allocated environment for a user (or customer of a resource provider) having an operating system provisioned on the resource. In accordance with the illustrated embodiment, the resource stack 602 includes a number of hardware resources 604, such as one or more central processing units (CPUs) 612; solid state drives (SSDs) or other storage devices 610; a network interface card (NIC) 606, one or more peripheral devices (e.g., a graphics processing unit (GPU), etc.) 608, a BIOS implemented in flash memory 616, and a baseboard management controller (BMC) 614, and the like. In some embodiments, the hardware resources 604 reside on a single computing device (e.g. chassis). In other embodiments, the hardware resources can reside on multiple devices, racks, chassis, and the like. Running on top of the hardware resources 604, a virtual resource stack may include a virtualization layer such as a hypervisor 618 for a Xen-based implementation, a host domain 620, and potentially also one or more guest domains 622 capable of executing at least one application 632. The hypervisor 618, if utilized for a virtualized environment, can manage execution of the one or more guest operating systems and allow multiple instances of different operating systems to share the underlying hardware resources 604. Conventionally, hypervisors are installed on server hardware, with the function of running guest operating systems, where the guest operating systems themselves act as servers.

In accordance with an embodiment, a hypervisor 618 can host a number of domains (e.g., virtual machines), such as the host domain 620 and one or more guest domains 622. In one embodiment, the host domain 620 (e.g., the Dom-0) is the first domain created and helps virtualize hardware resources and manage all of the other domains running on the hypervisor 618. For example, the host domain 620 can manage the creating, destroying, migrating, saving, or restoring the one or more guest domains 622 (e.g., the Dom-U). In accordance with various embodiments, the hypervisor 618 can control access to the hardware resources such as the CPU, input/output (I/O) memory, and hypervisor memory.

A guest domain 622 can include one or more virtualized or para-virtualized drivers 630 and the host domain can include one or more backend device drivers 626. When the operating system (OS) kernel 628 in the guest domain 622 wants to invoke an I/O operation, the virtualized driver 630 may perform the operation by way of communicating with the backend device driver 626 in the host domain 620. When the guest driver 630 wants to initiate an I/O operation (e.g., to send out a network packet), a guest kernel component can identify which physical memory buffer contains the packet (or other data) and the guest driver 630 can either copy the memory buffer to a temporary storage location in the kernel for performing I/O or obtain a set of pointers to the memory pages that contain the packet(s). In at least one embodiment, these locations or pointers are provided to the backend driver 626 of the host kernel 624 which can obtain access to the data and communicate it directly to the hardware device, such as the NIC 606 for sending the packet over the network.

It should be noted that the resource stack 602 illustrated in FIG. 6 is only one possible example of a set of resources that is capable of providing a virtualized computing environment and that the various embodiments described herein are not necessarily limited to this particular resource stack. In some embodiments, the guest domain 622 may have substantially native or "bare metal" access to the NIC 606 hardware, for example as provided by device assignment technology based on an IO Memory Management Unit (IO-MMU) device mapping solution like Intel VT-D. In such an implementation, there may be no virtualization layer (e.g., Hypervisor) present. The host domain, or OS, may then be provided by the user, with no guest domains utilized. Other technologies, such Single Root IO Virtualization (SR-IOV), may provide similar "bare metal" functionality to guest domains for only certain functionality of the devices. In general, in various other embodiments, the resource stack may comprise different virtualization strategies, hardware devices, operating systems, kernels, domains, drivers, hypervisors and other resources.

In compute servers, a Board Management Controller (BMC) 614 can maintain a list of events that have occurred in the system, referred to herein as a system event log (SEL). In at least one embodiment, the BMC 614 can receive system event logs from the BIOS 616 on the host processor. The BIOS 616 can provide data for system events over an appropriate interface, such as an I²C interface, to the BMC using an appropriate protocol, such as an SMBus System Interface (SSIF) or KCS interface over LPC. As mentioned, an example of a system event log event from BIOS includes an uncorrectable memory error, indicating a bad RAM stick. In at least some embodiments, system event logs recorded by BMCs on various resources can be used for purposes such as to monitor server health, including triggering manual replacement of parts or instance degrade when SELs from the BIOS indicate failure.

As mentioned, in a virtualized environment the hypervisor 618 can prevent the guest operating system, or guest domain 622, from sending such system event log data to the BMC 614. In the case of bare metal access without such a hypervisor, however, user instances can have the ability to send data for system event that spoof events from the BIOS 616. Such activity could lead to compromised bare metal instances being prematurely degraded due to fake system event data produced by the user OS.

In at least one embodiment, however, there will be portions of the physical resource 600 that will be inaccessible to the user OS. This can include, for example, at least a portion of BIOS memory 616. BIOS memory 616 in at least one embodiment is volatile memory such that any data stored to that memory will be lost in the event of a reboot or power down event. The BIOS may keep at least a portion of host memory unmapped, such that it is not discoverable by a host OS. As mentioned, data such as a secret token can be stored to BIOS memory 616 at boot time, before a user OS is executing on the resource. Once the user OS is executing on the resource, that OS will be prevented from accessing that secret token in BIOS memory 616. In at least one embodiment, this secret token (or other stored secret) can be provided to the BMC 614 when adding system event log events, whereby the BMC 614 can confirm that the event is being sent by the BIOS 616 and not by the user OS.

Figure 7:
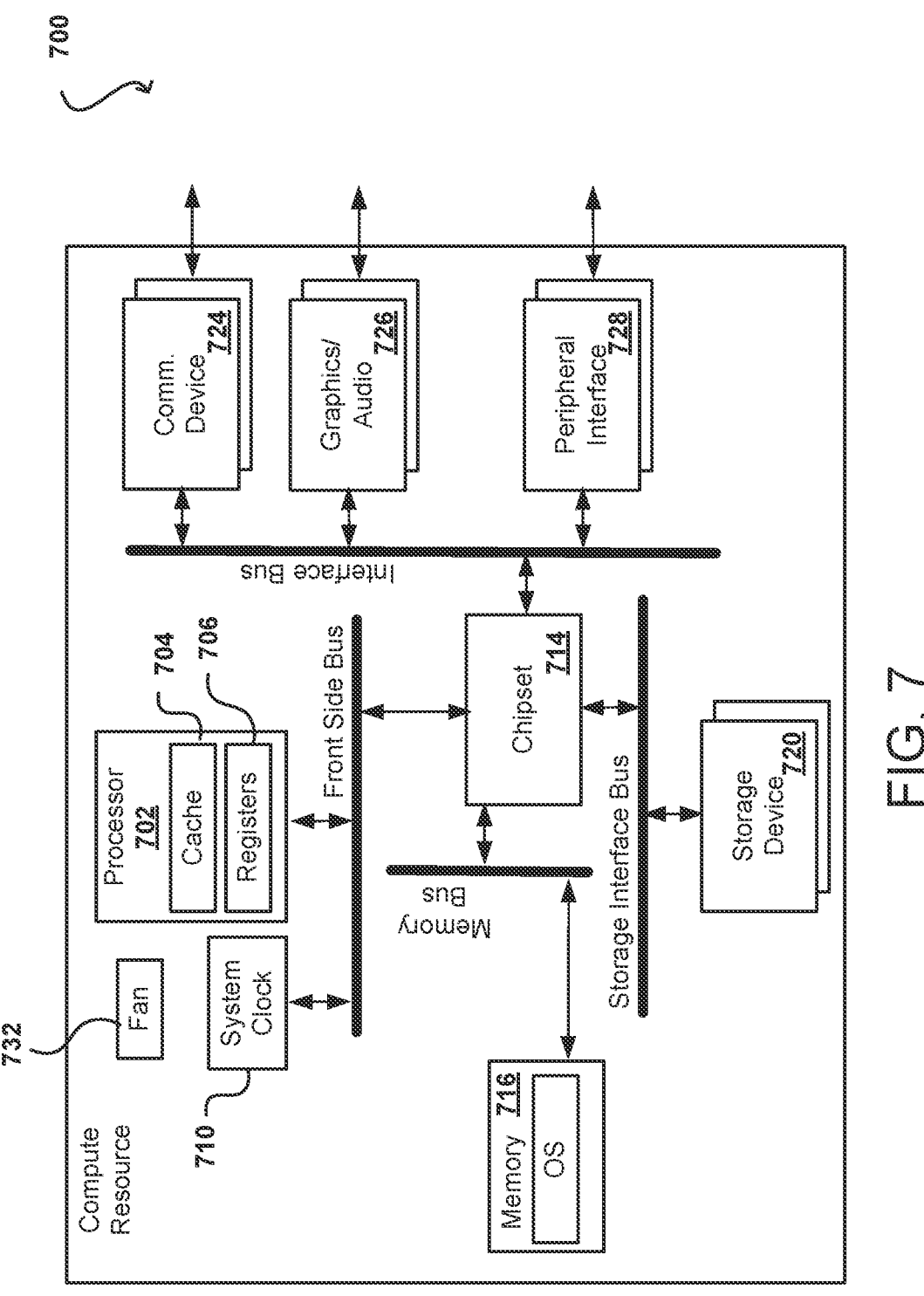
FIG. 7 illustrates example components of a computing device that can be used to implement aspects of various embodiments.

Computing resources, such as servers or personal computers, will generally include at least a set of standard components configured for general purpose operation, although various proprietary components and configurations can be used as well within the scope of the various embodiments. FIG. 7 illustrates components of an example computing resource 700 that can be utilized in accordance with various embodiments. It should be understood that there can be many such compute resources and many such components provided in various arrangements, such as in a local network or across the Internet or "cloud," to provide compute resource capacity as discussed elsewhere herein. The computing resource 700 (e.g., a desktop or network server) will have one or more processors 702, such as central processing units (CPUs), graphics processing units (GPUs), and the like, that are electronically and/or communicatively coupled with various components using various buses, traces, and other such mechanisms. A processor 702 can include memory registers 706 and cache memory 704 for holding instructions, data, and the like. In this example, a chipset 714, which can include a northbridge and southbridge in some embodiments, can work with the various system buses to connect the processor 702 to components such as system memory 716, in the form or physical RAM or ROM, which can include the code for the operating system as well as various other instructions and data utilized for operation of the computing device. The computing device can also contain, or communicate with, one or more storage devices 720, such as hard drives, flash drives, optical storage, and the like, for persisting data and instructions similar, or in addition to, those stored in the processor and memory. The processor 702 can also communicate with various other components via the chipset 714 and an interface bus (or graphics bus, etc.), where those components can include communications devices 724 such as cellular modems or network cards, media components 726, such as graphics cards and audio components, and peripheral interfaces 728 for connecting peripheral devices, such as printers, keyboards, and the like. At least one cooling fan 732 or other such temperature regulating or reduction component can also be included as well, which can be driven by the processor or triggered by various other sensors or components on, or remote from, the device. Various other or alternative components and configurations can be utilized as well as known in the art for computing devices.

At least one processor 702 can obtain data from physical memory 716, such as a dynamic random access memory (DRAM) module, via a coherency fabric in some embodiments. It should be understood that various architectures can be utilized for such a computing device, that may include varying selections, numbers, and arguments of buses and bridges within the scope of the various embodiments. The data in memory may be managed and accessed by a memory controller, such as a DDR controller, through the coherency fabric. The data may be temporarily stored in a processor cache 704 in at least some embodiments. The computing device 700 can also support multiple I/O devices using a set of I/O controllers connected via an I/O bus. There may be I/O controllers to support respective types of I/O devices, such as a universal serial bus (USB) device, data storage (e.g., flash or disk storage), a network card, a peripheral component interconnect express (PCIe) card or interface 728, a communication device 724, a graphics or audio card 726, and a direct memory access (DMA) card, among other such options. In some embodiments, components such as the processor, controllers, and caches can be configured on a single card, board, or chip (i.e., a system-on-chip implementation), while in other embodiments at least some of the components may be located in different locations, etc.

An operating system (OS) running on the processor 702 can help to manage the various devices that may be utilized to provide input to be processed. This can include, for example, utilizing relevant device drivers to enable interaction with various I/O devices, where those devices may relate to data storage, device communications, user interfaces, and the like. The various I/O devices will typically connect via various device ports and communicate with the processor and other device components over one or more buses. There can be specific types of buses that provide for communications according to specific protocols, as may include peripheral component interconnect) PCI or small computer system interface (SCSI) communications, among other such options. Communications can occur using registers associated with the respective ports, including registers such as data-in and data-out registers. Communications can also occur using memory-mapped I/O, where a portion of the address space of a processor is mapped to a specific device, and data is written directly to, and from, that portion of the address space.

Such a device may be used, for example, as a server in a server farm or data warehouse. Server computers often have a need to perform tasks outside the environment of the CPU and main memory (i.e., RAM). For example, the server may need to communicate with external entities (e.g., other servers) or process data using an external processor (e.g., a General Purpose Graphical Processing Unit (GPGPU)). In such cases, the CPU may interface with one or more I/O devices. In some cases, these I/O devices may be special-purpose hardware designed to perform a specific role. For example, an Ethernet network interface controller (NIC) may be implemented as an application specific integrated circuit (ASIC) comprising digital logic operable to send and receive packets.

In an illustrative embodiment, a host computing device is associated with various hardware components, software components and respective configurations that facilitate the execution of I/O requests. One such component is an I/O adapter that inputs and/or outputs data along a communication channel. In one aspect, the I/O adapter device can communicate as a standard bridge component for facilitating access between various physical and emulated components and a communication channel. In another aspect, the I/O adapter device can include embedded microprocessors to allow the I/O adapter device to execute computer executable instructions related to the implementation of management functions or the management of one or more such management functions, or to execute other computer executable instructions related to the implementation of the I/O adapter device. In some embodiments, the I/O adapter device may be implemented using multiple discrete hardware elements, such as multiple cards or other devices A management controller can be configured in such a way to be electrically isolated from any other component in the host device other than the I/O adapter device. In some embodiments, the I/O adapter device is attached externally to the host device. In some embodiments, the I/O adapter device is internally integrated into the host device. Also in communication with the I/O adapter device may be an external communication port component for establishing communication channels between the host device and one or more network-based services or other network-attached or direct-attached computing devices Illustratively, the external communication port component can correspond to a network switch, sometimes known as a Top of Rack ("TOR") switch. The I/O adapter device can utilize the external communication port component to maintain communication channels between one or more services and the host device, such as health check services, financial services, and the like.

The I/O adapter device can also be in communication with a Basic Input/Output System (BIOS) component. The BIOS component can include non-transitory executable code, often referred to as firmware, which can be executed by one or more processors and used to cause components of the host device to initialize and identify system devices such as the video display card, keyboard and mouse, hard disk drive, optical disc drive and other hardware. The BIOS component can also include or locate boot loader software that will be utilized to boot the host device. For example, in one embodiment, the BIOS component can include executable code that, when executed by a processor, causes the host device to attempt to locate Preboot Execution Environment (PXE) boot software. Additionally, the BIOS component can include or takes the benefit of a hardware latch that is electrically controlled by the I/O adapter device. The hardware latch can restrict access to one or more aspects of the BIOS component, such controlling modifications or configurations of the executable code maintained in the BIOS component. The BIOS component can be connected to (or in communication with) a number of additional computing device resources components, such as processors, memory, and the like. In one embodiment, such computing device resource components may be physical computing device resources in communication with other components via the communication channel. The communication channel can correspond to one or more communication buses, such as a shared bus (e.g., a front side bus, a memory bus), a point-to-point bus such as a PCI or PCI Express bus, etc., in which the components of the bare metal host device communicate. Other types of communication channels, communication media, communication buses or communication protocols (e g., the Ethernet communication protocol) may also be utilized. Additionally, in other embodiments, one or more of the computing device resource components may be virtualized hardware components emulated by the host device. In such embodiments, the I/O adapter device can implement a management process in which a host device is configured with physical or emulated hardware components based on a variety of criteria. The computing device resource components may be in communication with the I/O adapter device via the communication channel. In addition, a communication channel may connect a PCI Express device to a CPU via a northbridge or host bridge, among other such options.

In communication with the I/O adapter device via the communication channel may be one or more controller components for managing hard drives or other forms of memory. An example of a controller component can be a SATA hard drive controller. Similar to the BIOS component, the controller components can include or take the benefit of a hardware latch that is electrically controlled by the I/O adapter device. The hardware latch can restrict access to one or more aspects of the controller component. Illustratively, the hardware latches may be controlled together or independently. For example, the I/O) adapter device may selectively close a hardware latch for one or more components based on a trust level associated with a particular user. In another example, the I/O adapter device may selectively close a hardware latch for one or more components based on a trust level associated with an author or distributor of the executable code to be executed by the I/O adapter device. In a further example, the I/O adapter device may selectively close a hardware latch for one or more components based on a trust level associated with the component itself. The host device can also include additional components that are in communication with one or more of the illustrative components associated with the host device. Such components can include devices, such as one or more controllers in combination with one or more peripheral devices, such as hard disks or other storage devices. Additionally, the additional components of the host device can include another set of peripheral devices, such as Graphics Processing Units ("GPUs"). The peripheral devices and can also be associated with hardware latches for restricting access to one or more aspects of the component. As mentioned above, in one embodiment, the hardware latches may be controlled together or independently.

As discussed, different approaches can be implemented in various environments in accordance with the described embodiments. As will be appreciated, although a network-or Web-based environment is used for purposes of explanation in several examples presented herein, different environments may be used, as appropriate, to implement various embodiments. Such a system can include at least one electronic client device, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server for receiving requests and serving content in response thereto, although for other networks, an alternative device serving a similar purpose could be used, as would be apparent to one of ordinary skill in the art.

The illustrative environment includes at least one application server and a data store. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

The data store can include several separate data tables, databases or other data storage mechanisms and media for storing data relating to a particular aspect. For example, the data store illustrated includes mechanisms for storing content (e.g., production data) and user information, which can be used to serve content for the production side. The data store is also shown to include a mechanism for storing log or session data. It should be understood that there can be many other aspects that may need to be stored in the data store, such as page image information and access rights information, which can be stored in any of the above listed mechanisms as appropriate or in additional mechanisms in the data store. The data store is operable, through logic associated therewith, to receive instructions from the application server and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of the systems herein should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
monitoring network traffic for a group of computing resources in a selected region, of a plurality of regions, in a shared resource environment;
aggregating data, for a selected feature, over sources of the network traffic for a recent period of time;
modeling the aggregated data to generate a cumulative distribution function for the selected feature in the selected region over the recent period of time, wherein the modeling is performed dynamically through updates to the cumulative distribution function over different periods of time;
applying a threshold, which represents the plurality of regions and which remains unchanged for the updates to the cumulative distribution function, to the cumulative distribution function, the threshold representing at least one maximum value for the selected feature and corresponding to at least one normal activity level for the selected region;
identifying a source of a portion of the network traffic for which a respective value of the selected feature exceeds the threshold for the selected region using the at least one maximum value, indicating a probability that the source is engaging in malicious behavior; and
performing at least one mitigation action with respect to the identified source.

2. The computer-implemented method of claim 1, wherein the modeling is performed at regular intervals as part of the updates, and wherein values of the selected feature that correspond to the threshold between the regular intervals is also based at least in part upon the updates in the cumulative distribution function.

3. The computer-implemented method of claim 2, wherein a number of the computing resources in the group and a volume of the network traffic are able to increase or decrease between the regular intervals, and wherein the modeling is able to be performed regardless of the number of the computing resources or the volume of network traffic.

4. The computer-implemented method of claim 1, further comprising:
sampling data values for the selected feature from the aggregated data; and
performing the modeling using the sampled data values.

5. The computer-implemented method of claim 1, wherein the selected feature corresponds to a number of connection attempts or a number of accounts associated with the source of the portion of network traffic over the recent period of time.

6. A computer-implemented method, comprising:
obtaining feature data, associated with a plurality of features of network traffic, for a group of computing resources in a selected region, of a plurality of regions, in a shared resource environment over a period of time;
performing modeling of the feature data to generate a feature distribution for the period of time, wherein the modeling able to be performed independent of a volume of the network traffic over the period of time, and wherein the modeling is performed dynamically through updates to the feature distribution over different periods of time;
applying a feature threshold which represents the plurality of regions, which remains unchanged for the updates to the feature distribution and which is associated with at least one maximum value for the feature distribution;
identifying a source of a portion of the network traffic for which a value of the feature data exceeds the feature threshold for the selected region using one of the at least one maximum value; and
performing a determined action in response to the value of the feature data for the source being determined to exceed the feature threshold.

7. The computer-implemented method of claim 6, further comprising:
performing modeling of the feature data for a second region, which is different than the selected region of the plurality of regions; and
applying the feature threshold to a second feature distribution for the second region, wherein a value of the feature data that corresponds to the feature threshold differs between the selected region and the second region based, at least in part, upon a difference in an amount or a type of the network traffic between the selected region and the second region.

8. The computer-implemented method of claim 6, wherein the modeling is performed at regular intervals, and wherein values of the feature data that correspond to the feature threshold for the regular intervals is also based at least in part upon the updates in the feature distribution.

9. The computer-implemented method of claim 6, further comprising:
selecting at least one additional dimension for the modeling, the at least one additional dimension including a service, a port, a protocol, or an account; and
performing the modeling using the feature data that corresponds to the at least one additional dimension.

10. The computer-implemented method of claim 6, further comprising:
performing the modeling for at least two selected feature types of the feature data;
applying respective feature thresholds to feature distributions for the at least two selected feature types; and
performing the determined action in response to respective values of the feature data for the source exceeding one of the respective feature thresholds, all of the respective feature thresholds, or a determined combination of the respective feature thresholds.

11. The computer-implemented method of claim 6, wherein the feature distribution is one of a cumulative distribution function (CDF), a probabilistic distribution, a parametric function, a non-parametric function, an empirical function, or a Fréchet distribution.

12. The computer-implemented method of claim 6, wherein the feature data is obtained from one or more network traffic logs generated by a network traffic monitoring service.

13. The computer-implemented method of claim 6, wherein output corresponding to the feature distribution is stored to a lookup table for the selected region.

14. The computer-implemented method of claim 6, wherein the feature data selected for the modeling is associated with a probability of the source of the portion of the network traffic performing a port scanning attack across a region of address space of the group of computing resources.

15. The computer-implemented method of claim 6, wherein the determined action includes performing a detailed analysis, generating an alert, storing data for the source, throttling network traffic for the source, or blocking network traffic for the source.

16. A system, comprising:
a processor; and
memory including instructions that, when executed by the processor, cause the system to:
obtain feature data, associated with a plurality of features of network, traffic for a group of computing resources in a selected region, of a plurality of regions, in a shared resource environment over a period of time;
perform modeling of the feature data to generate a feature distribution for the period of time, wherein the modeling able to be performed independent of a volume of the network traffic over the period of time and wherein the modeling is performed dynamically through updates to the feature distribution over different periods of time;
apply a feature threshold which represents the plurality of regions, which remains unchanged for the updates to the feature distribution, and which is associated with at least one maximum value for the feature distribution;
identify a source of a portion of the network traffic for which a value of the feature data exceeds the feature threshold for the selected region using one of the at least one maximum value; and
perform a determined action in response to the value of the feature data for the source exceeding the feature threshold.

17. The system of claim 16, wherein the instructions when executed further cause the system to:
perform modeling of the feature data for a second region, which is different than the selected region of the plurality of regions; and
apply the feature threshold to a second feature distribution for the second region, wherein a value of the feature data that corresponds to the feature threshold differs between the selected region and the second region based, at least in part, upon a difference in an amount or type of the network traffic between the selected region and the second region.

18. The system of claim 16, wherein the modeling is performed at regular intervals, and wherein values of the feature data that correspond to the feature threshold for the regular intervals is also based at least in part upon the updates in the feature distribution.

19. The system of claim 16, wherein the instructions when executed further cause the system to:
select at least one additional dimension for the modeling, the at least one additional dimension including a service, a port, a protocol, or an account; and
perform the modeling using the feature data that corresponds to the at least one additional dimension.

20. The system of claim 16, wherein the instructions when executed further cause the system to:
perform the modeling for at least two selected feature types of the feature data;
apply respective feature thresholds to feature distributions for the at least two selected feature types; and
perform the determined action in response to respective values of the feature data for the source exceeding one of the respective feature thresholds, all of the respective feature thresholds, or a determined combination of the respective feature thresholds.

\* \* \* \* \*